(12) United States Patent
Schmid et al.

(10) Patent No.: US 10,414,660 B2
(45) Date of Patent: Sep. 17, 2019

(54) PROCESS AND PLANT THAT DECOMPOSES MONOSILANE

(71) Applicant: Schmid Silicon Technology GmbH, Freudenstadt (DE)

(72) Inventors: Christian Schmid, Freudenstadt (DE); Georgij Petrik, Böblingen (DE); Jochem Hahn, Rottenburg am Neckar (DE)

(73) Assignee: Schmid Silicon Technology GmbH, Freudenstadt (DE)

( * ) Notice: Subject to any disclaimer, the term of this patent is extended or adjusted under 35 U.S.C. 154(b) by 0 days.

(21) Appl. No.: 15/574,184

(22) PCT Filed: Apr. 21, 2016

(86) PCT No.: PCT/EP2016/058939
§ 371 (c)(1),
(2) Date: Nov. 15, 2017

(87) PCT Pub. No.: WO2016/184638
PCT Pub. Date: Nov. 24, 2016

(65) Prior Publication Data
US 2018/0134564 A1     May 17, 2018

(30) Foreign Application Priority Data

May 15, 2015 (DE) .................. 10 2015 209 008

(51) Int. Cl.
*C01B 33/035*     (2006.01)
*C01B 33/029*     (2006.01)
(52) U.S. Cl.
CPC .......... *C01B 33/035* (2013.01); *C01B 33/029* (2013.01)
(58) Field of Classification Search
CPC .................... C01B 33/035; C01B 33/029
See application file for complete search history.

(56) References Cited

U.S. PATENT DOCUMENTS 4,147,814 A * 4/1979 Yatsurugi .............. C01B 33/035
                                                                           118/725
4,150,168 A     4/1979 Yatsurugi et al.
(Continued)

FOREIGN PATENT DOCUMENTS

CA           728584 A     2/1966
DE     29 19 086 A1    3/1980
(Continued)

OTHER PUBLICATIONS

G. Hsu et al., "Fines in Fluidized Bed Silane Pyrolysis," Journal of the Electrochemical Society, vol. 131, No. 3, Jan. 1, 1984, pp. 660-663.
(Continued)

*Primary Examiner* — Melvin C. Mayes
*Assistant Examiner* — Michael Forrest
(74) *Attorney, Agent, or Firm* — DLA Piper LLP (US)

(57) ABSTRACT

A method that decomposes monosilane wherein a monosilane-containing gas stream is circulated in a circuit system including a reactor that decomposes the monosilane, the method including injecting a monosilane-containing gas stream into the reactor, bringing the gas stream into contact with a heated surface inside the reactor at which surface a portion of the monosilane in the gas stream is decomposed to deposit a solid silicon layer on the surface so that the concentration of the monosilane in the gas stream decreases, discharging the gas stream from the reactor, reprocessing the gas stream including at least partially compensating the decrease in the monosilane concentration resulting from the decomposition by addition of monosilane, and reinjecting the reprocessed, monosilane-containing gas stream into the reactor, wherein during deposition an operating pressure of 2.5 to 10 bar is established and the gas stream enters the reactor at a velocity of less than 7.5 m/s.

14 Claims, 1 Drawing Sheet

(56) References Cited

U.S. PATENT DOCUMENTS

| | | | |
|---|---|---|---|
| 4,676,967 A | | 6/1987 | Breneman |
| 4,784,840 A | | 11/1988 | Gautreaux et al. |
| 4,831,964 A | * | 5/1989 | Jacubert ................ C01B 33/035 |
| | | | 118/725 |
| 5,139,762 A | | 8/1992 | Flagella |
| 8,043,660 B2 | * | 10/2011 | Endoh ................... C01B 33/325 |
| | | | 427/255.393 |
| 2010/0272922 A1 | | 10/2010 | Revankar et al. |
| 2011/0262338 A1 | | 10/2011 | Schmid et al. |
| 2011/0305604 A1 | * | 12/2011 | Stocklinger .............. B01J 15/00 |
| | | | 422/200 |
| 2013/0084234 A1 | | 4/2013 | Bhusaapu et al. |
| 2014/0134832 A1 | * | 5/2014 | Kurosawa ............. C01B 33/035 |
| | | | 438/488 |
| 2017/0225957 A1 | * | 8/2017 | Netsu ..................... B01J 19/087 |

FOREIGN PATENT DOCUMENTS

| | | |
|---|---|---|
| DE | 33 11 650 A1 | 10/1983 |
| DE | 10 2008 017 304 A1 | 10/2009 |
| DE | 10 2009 003 368 B3 | 3/2010 |
| DE | 10 2011 089 695 A1 | 6/2013 |
| EP | 2 275 387 A2 | 1/2011 |

OTHER PUBLICATIONS

Russian Office Action dated Dec. 20, 2018, of counterpart Russian Application No. 2017135583/05, in English.

\* cited by examiner

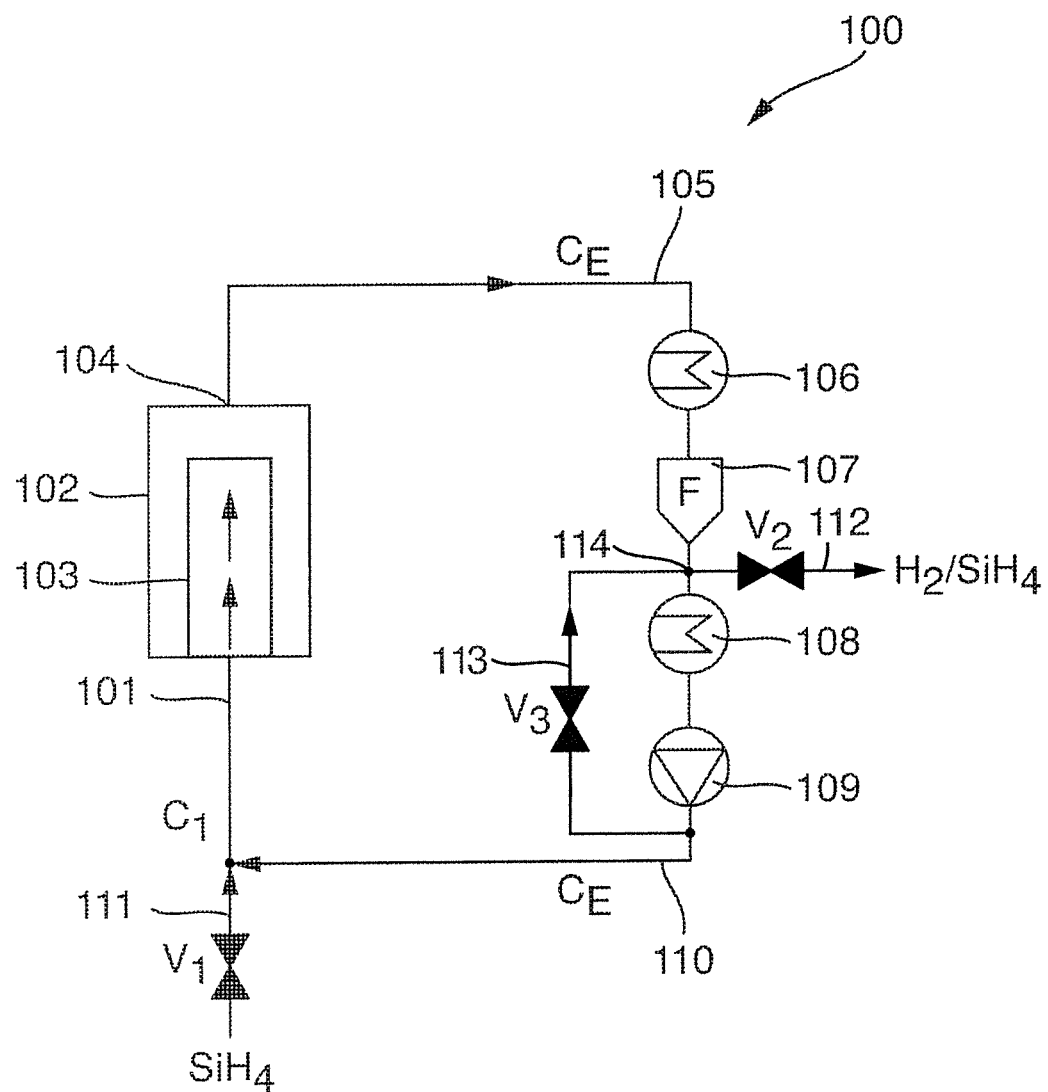

PROCESS AND PLANT THAT DECOMPOSES MONOSILANE

TECHNICAL FIELD

This disclosure relates to a process and a plant that decomposes monosilane for the purpose of producing high-purity silicon.

BACKGROUND

High-purity silicon is generally produced in a multistage process starting from metallurgical silicon generally still comprising a relatively high proportion of impurities. To purify the metallurgical silicon it can, for example, be converted into a trihalogensilane such as trichlorosilane ($SiHCl_3$) that is subsequently thermally decomposed to afford high-purity silicon. Such a procedure is known from DE 29 19 086 A1, for example. Alternatively, high-purity silicon may also be obtained by thermal decomposition of monosilane ($SiH_4$) as is described in DE 33 11 650 A1, for example.

In recent years, obtaining highest-purity silicon by thermal decomposition of monosilane has increasingly come to the fore. Thus, for example, DE 10 2011 089 695 A1 and DE 10 2009 003 368 B3 disclose reactors into which monosilane may be injected and in which highly heated silicon rods on which the monosilane is decomposed are arranged. The silicon generated is deposited in metallic form on the surface of the silicon rods.

So that the deposition may be better controlled, it is customary to inject into reactors such as that described in DE 10 2009 003 368 B3, for example, a mixture of monosilane and a carrier gas such as hydrogen rather than pure monosilane. However, care must be taken to ensure that this gas mixture does not become excessively hot. Above a temperature of 400° C. there is a danger of decomposition of the monosilane occurring even in the gas phase which can result in intensified formation of undesired byproducts. To avoid this, the concentration of monosilane in the mixture is normally kept very low.

In practice, the temperature of the gas mixture inside a reactor is very difficult to control since large temperature gradients exist inside the reactor. These problems are further intensified when the amount of the gas mixture injected into the reactor is increased to deposit larger amounts of silicon. In modern reactors, the target throughput of monosilane-containing gas mixture may be more than 10000 $Nm^3$ (standard cubic meters).

Such a high throughput can easily lead to turbulent flows inside the reactor that results in an undesirably efficient heat exchange between the gas mixture and the highly heated silicon rods occurring. This brings about the mentioned undesired increase in the temperature of the gas mixture. The silicon rods are also cooled. This results in increased energy consumption.

Such disadvantages have hitherto been accepted since turbulent flows are certainly also associated with positive effects. It is desired that silicon be deposited as evenly as possible on all regions of the mentioned highly heated silicon rods. Turbulizing the gas mixture injected into the reactors is regarded as conducive thereto.

It could therefore be helpful to provide a process for thermal decomposition of monosilane where even at a throughput of monosilane-containing gas mixture of more than 10000 $Nm^3$ the known problems occur only to a comparatively small extent, if at all.

SUMMARY

We provide a method that decomposes monosilane where a monosilane-containing gas stream is circulated in a circuit system including a reactor that decomposes the monosilane present in the gas stream, the method including (1) injecting a monosilane-containing gas stream into the reactor, (2) bringing the gas stream into contact with a heated surface inside the reactor at which surface a portion of the monosilane present in the gas stream is decomposed to deposit a solid silicon layer on the surface so that the concentration of the monosilane in the gas stream decreases, (3) discharging the gas stream from the reactor, (4) reprocessing the gas stream including at least partially compensating the decrease in the monosilane concentration resulting from the decomposition by addition of monosilane, and (5) reinjecting the reprocessed, monosilane-containing gas stream into the reactor according to step (1), wherein during deposition inside the circuit system an operating pressure of 2.5 bar to 10 bar (absolute) is established and the gas stream enters the reactor at a velocity of less than 7.5 m/s.

We also provide a plant that decomposes monosilane in accordance with the method including (1) a circuit system in which a monosilane-containing gas stream can be circulated at an operating pressure of 2.5 bar to 10 bar, (2) a reactor which is part of the circuit system and includes a device that injects the monosilane-containing gas stream into the reactor and an outlet that discharges the gas stream from the reactor, (3) a supply that provides a highly heated silicon surface inside the reactor, (4) a cooler that cools the gas stream discharged from the reactor, (5) a reprocessor that reprocesses the gas stream, including a device that increases the concentration of monosilane in the gas stream, and (6) a circulator of the gas stream at the operating pressure.

BRIEF DESCRIPTION OF THE DRAWING

FIG. 1 depicts a flow diagram of an example of a plant 100 (schematic diagram).

DETAILED DESCRIPTION

To decompose monosilane, a monosilane-containing gas stream is circulated in a circuit system comprising a reactor to decompose the monosilane present in the gas stream. The circuit always comprises the following steps:

(1) In this step, a monosilane-containing gas stream is injected into the reactor. Similarly to known processes, the gas stream is preferably a gas mixture composed of a carrier gas and monosilane. The carrier gas used is particularly preferably hydrogen.
Reactors suitable in principle include the reactors described in DE 10 2011 089 695 A1 and DE 10 2009 003 368 B3. Properties of particularly suitable reactors will be addressed in more detail.

(2) In this step, the gas stream is brought into contact with a highly heated surface inside the reactor. A portion of the monosilane present in the gas stream decomposes at this surface. The concentration of monosilane in the gas stream thus decreases. As a result of the decomposition, a solid silicon layer is deposited on the highly heated surface. This layer is the desired product of the process.

(3) In this step, the gas stream is discharged from the reactor. The gas stream discharged from the reactor has a markedly lower concentration of monosilane than the gas stream injected into the reactor. The gas stream moreover has a markedly higher temperature than when it was injected into the reactor.

(4) In this step, the gas stream discharged from the reactor is reprocessed. The reprocessing process comprises in particular at least partially compensating, preferably fully compensating, the decrease in the monosilane concentration resulting from decomposition. This is effected by appropriate addition of monosilane. Reprocessing of the gas stream may moreover preferably comprise additional purification and cooling steps.

(5) In this step, the gas stream resulting from step (4) is reinjected into the reactor. The circuit ends here.

It is particularly preferable when, during the deposition, an operating pressure of 2.5 bar to 10 bar (absolute) is established inside the circuit system. Within this range, values of 3 bar to 10 bar (absolute), in particular 4 bar to 8 bar (absolute), particularly preferably 4 bar to 7 bar (absolute), are more preferred.

At the same time, it is ensured that no turbulent flows occur inside the reactor. To ensure this the gas stream enters the reactor at a velocity of less than 7.5 m/s, preferably less than 5 m/s, particularly preferably less than 2.5 m/s. The operating pressure inside the circuit system is preferably essentially constant. Although pressure variations inside the circuit system are not completely avoidable they are, however, usually very small.

To start up the reactor, the circuit system is generally initially purged with nitrogen and subsequently filled with hydrogen until the desired operating pressure has been achieved. A compressor or a blower is generally required to circulate the hydrogen inside the circuit system.

It is preferable when the concentration of monosilane in the gas stream to be injected into the reactor according to step (1) is maintained at 0.5 vol % to 5 vol %, preferably 0.5 vol % to 3 vol %, during the deposition.

It is generally sought to keep the concentration of monosilane in the reactor low. Decomposition reactions should not occur in the gas phase, but at the highly heated surface. Otherwise, as mentioned at the outset, undesired generally dusty byproducts are obtained. The smallest possible number of collisions between silane molecules (among themselves), decomposition products (among themselves) and between silane molecules and decomposition products should occur in the gas phase. The high operating pressure surprisingly suppresses formation of the byproducts without a trade-off of low deposition rates.

It is preferable when, in step (4), the concentration of monosilane in the gas stream is raised by not more than 1 vol %, preferably by not more than 0.5 vol %, particularly preferably by not more than 0.25 vol %. This measure further suppresses formation of the dusty byproducts.

It is particularly preferable when with increasing thickness of the silicon layer on the surface the amount of monosilane in the gas stream injected into the reactor according to step (1) per unit time (and thus the mass of monosilane injected into the reactor per unit time) is gradually increased. In other words the mass flow of the monosilane injected into the reactor is increased.

This is particularly preferably achieved by gradually raising the concentration of monosilane in the gas stream in step (4). In this example, the decrease in the monosilane concentration occurring as a result of decomposition is gradually compensated or overcompensated. The volume concentration of monosilane in the gas stream thus increases somewhat. The above defined preferred concentration thresholds for the concentration of monosilane in the gas stream are to be observed in preferred examples. Raising the concentration is preferably effected continuously or in a plurality of consecutive steps.

Alternatively or in addition to this particularly preferred example, it is also possible to increase the mass flow of the monosilane injected into the reactor by increasing the flow rate at which the monosilane-containing gas stream circulates in the circuit system in particular by the mentioned compressor or blower. The above defined preferred threshold values for the velocity at which the gas stream enters the reactor are to be observed.

In practice, a combination of the two preferred measures has proven advantageous. It is preferable when the flow rate at which the monosilane-containing gas stream circulates in the circuit system is gradually increased during operation. However, so that no turbulences are generated in the reactor and the heat exchange between the highly heated surface in the reactor and the gas stream does not become excessive, the flow rate should not be set too high. Usually, therefore, the concentration of monosilane in the gas stream is gradually raised in addition.

The highly heated surface inside the reactor on which monosilane can decompose generally also increases in size with increasing operating time and increasing thickness of the silicon layer. If the mass of monosilane injected into the reactor per unit time is not increased then the thickness of the deposited silicon layer increases ever more slowly. This is counteracted by the described measures. The growth rate of the deposited silicon layer is thus controlled exclusively via the mass of the monosilane injected into the reactor.

As an alternative to the described preferred measures, it would also be possible to increase the mass of monosilane injected into the reactor per unit time by raising the operating pressure. However, in most cases, the preferred raising of the monosilane concentration is the more suitable process variant.

It has already been mentioned briefly that pressure variations inside the circuit system usually cannot be avoided completely. However maximum and minimum pressures inside the circuit system generally diverge from one another by not more than 500 mbar, preferably by not more than 300 mbar. Divergences of less than 200 mbar, particularly preferably even of less than 100 mbar, are even more preferred. Small variations may occur at the reactor entrance and the reactor exit, for example. However, the greatest pressure difference is usually established at the compressor or blower.

Raising the operating pressure during operation may occur as a result of decomposition taking place in the reactor (two mol of hydrogen are formed from one mol of monosilane). The operating pressure is also increased by the monosilane addition. Thus, in preferred examples, a pressure equalization is effected at regular or irregular intervals or continuously by releasing gas from the circuit system. This pressure equalization can be controlled by an overpressure valve, for example.

It is preferable when the temperature of the gas stream injected into the reactor in steps (1) and (5) is adjusted to a value of 25° C. to 75° C., in particular 40° C. to 60° C. Upon discharging the gas stream from the reactor, the temperature thereof is generally 400° C. to 700° C., in particular 500° C. to 600° C.

Reactors such as those described in DE 10 2011 089 695 A1 and DE 10 2009 003 368 B3 are not the only reactors suitable to perform the process. On the contrary, it is also possible for the reactor employed to be a fluidized bed reactor with a highly heated surface provided by highly heated silicon particles in a fluidized bed. However, it is particularly preferable for the decomposition of the monosilane to be effected on highly heated silicon rods.

As already touched upon, the growth rate of the deposited silicon layer is preferably controlled via the mass of the monosilane injected into the gas stream. The mass of monosilane injected into the reactor per unit time is increased with advancing operating time and increasing thickness of the silicon layer.

It is preferable when the mass of monosilane in the gas stream to be injected into the reactor according to step (1)/(5) increases proportionally with the increase in size of the highly heated surface.

It is particularly preferable when the highly heated silicon surface has been adjusted to a temperature of 800° C. to 1000° C., particularly preferably to a temperature of about 900° C.

Preferably, the concentration of monosilane in the gas stream discharged from the reactor is determined via a measurement. Optionally, at the reactor entrance, the concentration of monosilane in the gas stream to be injected into the reactor is also determined. The monosilane addition in step (4) and thus the concentration of monosilane in the gas stream to be injected into the reactor according to step (1)/(5) and ultimately also the mass of the monosilane injected into the reactor per unit time and optionally the gradual increasing of this mass with advancing operating time can then be open- or closed-loop controlled as a function of the measured result(s).

Further preferably, the thickness of the silicon layer deposited on the highly heated surface is determined arithmetically or via a measurement and the monosilane addition in step (4) and thus the concentration of monosilane in the gas stream to be injected into the reactor according to step (1)/(5) and ultimately also the mass of the monosilane injected into the reactor per unit time and optionally the gradual increasing of this mass with advancing operating time can then be open- or closed-loop controlled as a function of the measured result.

The thickness of the silicon layer may be determined by an optical measurement, for example. However it is preferable to track the change in the electrical resistance of the silicon rods. As an alternative, it is also possible to track the change in the monosilane concentration in the reactor over the operating time (preferably continuous determination of the monosilane concentration at the reactor entrance and at the reactor exit) and to arithmetically determine the increase in the thickness of the silicon layer therefrom (knowing the gas volume passed through the reactor).

As an alternative, it is also possible to determine the mass of monosilane injected into the circuit system. Since the proportion of injected monosilane converted into metallic silicon is known from empirical values, this can be used to calculate the change in thickness.

It is particularly preferable in the context of the process to employ reactors having at least one of the following features:

The reactors preferably comprise a reactor bottom and a reactor top mounted thereupon that together encompass a reactor interior in which the abovementioned highly heated silicon rods can be arranged. Holders integrated into the reactor bottom or arranged in or on the reactor bottom are provided to arrange the silicon rods inside the reactor.

Inside the reactors, the silicon rods are preferably oriented vertically with respect to the reactor bottom and, in preferred examples, point perpendicularly upwards inside the reactor interior.

The silicon rods each have two free ends, each of these ends having one of the holders assigned to it. It is preferable when they have a U-shape, for example.

The reactors described in DE 10 2011 089 695 A1 and DE 10 2009 003 368 B3 have these features.

The monosilane-containing gas stream is preferably injected into the reactor via inlet nozzles. These nozzles are preferably integrated into the mentioned reactor bottom or arranged on the reactor bottom or above the reactor bottom in the reactor interior.

It is preferable when the gas stream exits these inlet nozzles at the mentioned velocity of less than 7.5 m/s, preferably less than 5 m/s, particularly preferably less than 2.5 m/s. A very high number of nozzles may be chosen to ensure that these flow velocities can be adhered to even at high throughputs. A further parameter that can influence the flow rate is the diameter of the opening through which the gas stream exits the nozzle. This opening is preferably a circular opening. The diameter of the opening is preferably 10 mm to 80 mm, in particular 20 mm to 60 mm.

The number of nozzles arranged in the reactor may optionally run into three figures. It is preferable when employable reactors have 50 to 500 nozzles, particularly preferably 100 to 300 nozzles. The dimensions of the reactor and/or the number of nozzles and/or the diameter of the openings are preferably geared to an operating volume flow of 500 m$^3$ to 25000 m$^3$, preferably 10000 m$^3$ to 25000 m$^3$ of monosilane-containing gas per hour (the reported values relate to volumes at 1.01325 bar and 323 K). The actual volumes to be injected are lower on account of the above-mentioned compression of the gas stream to pressures of 2.5 to 10 bar. This allows the velocity of the gas on entry into the reactor to be kept low which is preferable for the reasons previously mentioned (avoidance of turbulences and avoidance of an undesired cooling of the silicon rods).

In virtually all preferred examples, the monosilane-containing gas stream is passed vertically through the reactor from bottom to top thus passing the highly heated surface, in particular the highly heated silicon rods. At the upper end of the reactor the gas stream can be diverted downward as described in DE 10 2011 089 695 A1 and exit the reactor again via the reactor bottom. Alternatively, the gas stream may also be discharged from the reactor through an outlet at the upper end of the reactor top. It is moreover naturally also possible to discharge the gas mixture from the reactor via a pipe passing through the reactor bottom and protruding far into the interior of the reactor. Such a reactor design is described in DE 10 2009 003 368 B3.

All of these examples have the advantage that turbulences in the region of the highly heated surface are minimized.

The reprocessing of the gas stream in step (4) comprises at least one, preferably two or more, in particular all, of the following substeps:

the gas stream is cooled,
the gas stream is passed through a filter, and
the gas stream is admixed with monosilane.

The cooling serves to end decomposition reactions in the gas phase as rapidly as possible after the gas stream has been discharged from the reactor. As mentioned above, the temperature of the gas flowing out of the reactor may be up to 700° C. in preferred examples.

Dusty byproducts formed by decomposition reactions in the gas phase may be carried out of the reactor with the gas stream. These must naturally be removed. This purpose especially is served by the cited filter.

The gas stream is circulated in the circuit system via a compressor or via a blower. This has proven to be particularly advantageous to inject the monosilane into the gas stream between this compressor/blower and the entrance into the reactor. The reason for this is that the monosilane addition can significantly increase the density of the gas stream that can pose a potential problem for the compressor/the blower. Injecting the concentration of monosilane in the gas stream into the circuit system downstream of the compressor/blower but upstream of the reactor based on the direction of flow of the gas stream in the circuit system minimizes the burden on the compressor/blower.

The plant performs the above described process. The plant comprises at least the following components:

(1) a circuit system configured such that a monosilane-containing gas stream can be circulated therein at an operating pressure of 2.5 bar to 10 bar,
(2) a reactor which is part of the circuit system and comprises a means that injects the monosilane-containing gas stream into the reactor and an outlet to discharge the gas stream from the reactor,
(3) a means providing a highly heated silicon surface inside the reactor,
(4) a means cooling the gas stream discharged from the reactor,
(5) at least one means reprocessing the gas stream, including a means increasing the concentration of monosilane in the gas stream, and
(6) a means that circulates the gas stream at the cited operating pressure.

Reactors suitable for the plant including nozzles suitable for injecting the monosilane-containing gas stream (as a means for injecting the gas stream) are mentioned in the context of the description of the process. The process moreover discloses highly heated silicon rods as a preferred choice for providing a highly heated silicon surface and a preferred means that circulates the gas stream at the cited operating pressure, namely the mentioned compressor or the blower.

The means that cools the gas stream discharged from the reactor is preferably at least one heat exchanger. The at least one means that reprocesses the gas stream preferably comprises the abovementioned filter.

The means that increase the concentration of monosilane in the gas stream may in the simplest case be a connection to a monosilane source coupled to the circuit system via a control valve. In conformity with the above intimations, the coupling is realized downstream of the compressor/blower, but upstream of the reactor.

Further features and advantages are evident from the following description of the FIGURE. The FIGURE is merely for elucidation and improved understanding of our processes and plants and is in no way to be understood as limiting.

FIG. 1 depicts a flow diagram of an example of a plant 100 (schematic diagram). A gas mixture composed of hydrogen and monosilane is injected via the conduit 101 into the reactor 102. U-shaped silicon rods 103 are arranged in the reactor. The rods are heated to a temperature greater than 800° C. Monosilane coming into contact with the highly heated rods decomposes on the surface thereof to form a layer of metallic silicon.

The monosilane-hydrogen mixture flows through the reactor 102 from bottom to top and exits the reactor at exit 104. The gas mixture is sent to a reprocessing via the conduit 105. The mixture is initially cooled by the heat exchanger 106. It is subsequently freed of particulate impurities by the filter 107. It may be cooled once more in optional heat exchanger 108. The blower 109 circulates the gas mixture through the described constituents of the plant 100 in the circuit. The gas mixture is sent back to the reactor 102 via the conduit 110.

A portion of the gas mixture can after flowing through the blower 109 be branched off from the conduit 110 and via the bypass conduit 113 be reinjected into the circuit at point 114 upstream of the blower 109. The proportion of the branched-off gas mixture can be controlled via the valve $V_3$. A partial recycling of the gas mixture may be advantageous in particular in the initial stage of the decomposition. In this stage, it is possible that without recycling the gas mixture 109, the blower is in underloaded operation because the flow rate at which the gas mixture is circulated in the circuit system must still be very low.

Of greater importance is the conduit 111. Monosilane from a monosilane source is injected into the circuit system via the conduit. Control of the monosilane supply may also be effected via the valve $V_1$. Of importance here is that, in the direction of flow, injection of the gas mixture is effected downstream of the blower 109. An overpressure formed in the circuit system can be relieved via the conduit 112. This can be achieved, for example, using overpressure valve $V_2$.

The circulating gas mixture exhibits a maximum ($C_I$) in terms of the proportion of monosilane in the gas mixture immediately after its injection via conduit 111. On account of the thermal decomposition of the monosilane in the reactor 102, the concentration of monosilane in the gas mixture is markedly lower ($C_E$) after exit from the reactor, the difference between $C_I$ and $C_E$ being less than 0.5 mol %. The concentration does not change during the cooling phase and the purification of the gas mixture.

The operating pressure inside the described circuit system is 6 bar.

The invention claimed is:

1. A method that decomposes monosilane where a monosilane-containing gas stream is circulated in a circuit system comprising a reactor that decomposes the monosilane present in the gas stream, the method comprising:
   (1) injecting a monosilane-containing gas stream into the reactor,
   (2) bringing the gas stream into contact with a heated surface inside the reactor at which surface a portion of the monosilane present in the gas stream is decomposed to deposit a solid silicon layer on the surface so that the concentration of the monosilane in the gas stream decreases,
   (3) discharging the gas stream from the reactor,
   (4) reprocessing the gas stream including at least partially compensating the decrease in the monosilane concentration resulting from the decomposition by addition of monosilane, and
   (5) reinjecting the reprocessed, monosilane-containing gas stream into the reactor according to step (1),
wherein during deposition inside the circuit system an operating pressure of 2.5 bar to 10 bar (absolute) is established and the gas stream enters the reactor at a velocity of less than 7.5 m/s.

2. The process according to claim 1, wherein the concentration of monosilane in the gas stream to be injected into the reactor according to step (1) is maintained at 0.5 vol % to 5 vol % during the deposition.

3. The process according to claim 1, wherein, in step (4), the concentration of monosilane in the gas stream is raised by not more than 1 vol %.

4. The process according to claim 2, wherein, with increasing thickness of the silicon layer on the surface, the mass of monosilane in the gas stream injected into the reactor according to step (1) per unit time is gradually increased, and the mass of monosilane per unit time is increased by gradually raising the concentration of monosilane in the gas stream in step (4) and/or by increasing the flow rate at which the monosilane-containing gas stream circulates in the circuit system.

5. The process according to claim 1, wherein the temperature of the gas stream
   upon injection into the reactor is adjusted to a value of 25° C. to 75° C. and/or
   upon discharging from the reactor is 400° C. to 700° C.

6. The process according to claim 1, wherein the heated surface is provided in the form of heated silicon rods and increases in size with increasing thickness of the silicon layer.

7. The process according to claim 1, wherein the concentration of monosilane in the gas stream discharged from the reactor is determined via a measurement and the monosilane addition in step (4) is quantitatively open-/closed-loop controlled as a function of the measured result.

8. The process according to claim 1, wherein the thickness of the silicon layer is determined arithmetically or by measurement and gradual increasing of the mass of monosilane in the gas stream injected into the reactor according to step (1) per unit time is open-/closed-loop controlled as a function of the measured result.

9. The process according to claim 1, wherein the reactor has at least one of the following features:
   said reactor comprises a reactor bottom and a reactor top mounted thereupon that together encompass a reactor interior in which the silicon rods are arranged in holders arranged on the reactor bottom or integrated into the reactor bottom,
   the silicon rods inside the reactor are oriented vertically with respect to the reactor bottom and point perpendicularly upwards inside the reactor interior, and
   the silicon rods each have two free ends, each of the ends having one of the holders assigned to it.

10. The process according to claim 9, wherein the monosilane-containing gas stream is injected into the reactor via inlet nozzles, wherein
    the nozzles are integrated into the reactor bottom or arranged on the reactor bottom or above the reactor bottom in the reactor interior, and/or
    the gas stream exits the inlet nozzles at a velocity of <7.5 m/s.

11. The process according to claim 10, wherein the monosilane-containing gas stream is:
    passed vertically through the reactor from bottom to top, and/or
    discharged from the reactor through an outlet at the tip of the reactor top.

12. The process according to claim 1, wherein the reprocessing of the gas stream in step (4) comprises at least one of:
    the gas stream is cooled,
    the gas stream is passed through a filter, and
    the gas stream is admixed with monosilane.

13. A plant that decomposes monosilane in accordance with the method according to claim 1, comprising:
    (1) a circuit system in which a monosilane-containing gas stream can be circulated at an operating pressure of 2.5 bar to 10 bar,
    (2) a reactor which is part of the circuit system and comprises a device that injects the monosilane-containing gas stream into the reactor and an outlet that discharges the gas stream from the reactor,
    (3) a supply that provides a highly heated silicon surface inside the reactor,
    (4) a cooler that cools the gas stream discharged from the reactor,
    (5) a reprocessor that reprocesses the gas stream, including a device that increases the concentration of monosilane in the gas stream,
    (6) a circulator of the gas stream at the operating pressure, and
    (7) an injector device that injects the monosilane-containing gas stream into the reactor comprising 100 to 300 nozzles, wherein the nozzles each have an opening through which the gas flow exits the nozzle, and dimensions of the reactor and/or the number of nozzles and/or diameters of the openings are controlled to an operating volume flow of 10000 $m^3$ to 25000 $m^3$ at volumes of 1.01325 bar and 323 K of monosilane-containing gas per hour.

14. The plant according to claim 13, wherein the reprocessor is arranged immediately downstream of the circulator of the gas stream based on the direction of flow of the gas stream in the circuit system.

* * * * *